Armstrong & Keeney,
Window Screen.
No. 100,966. Patented Mar. 22. 1870.
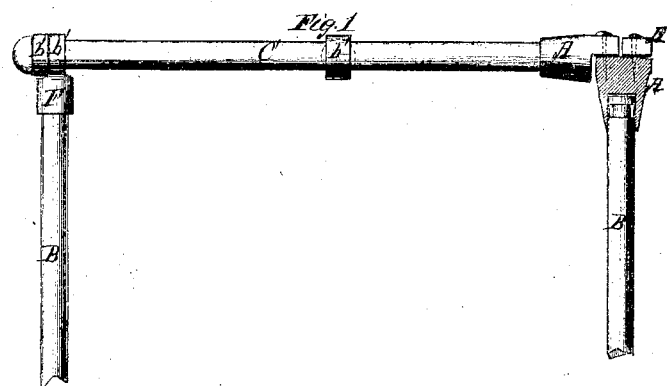
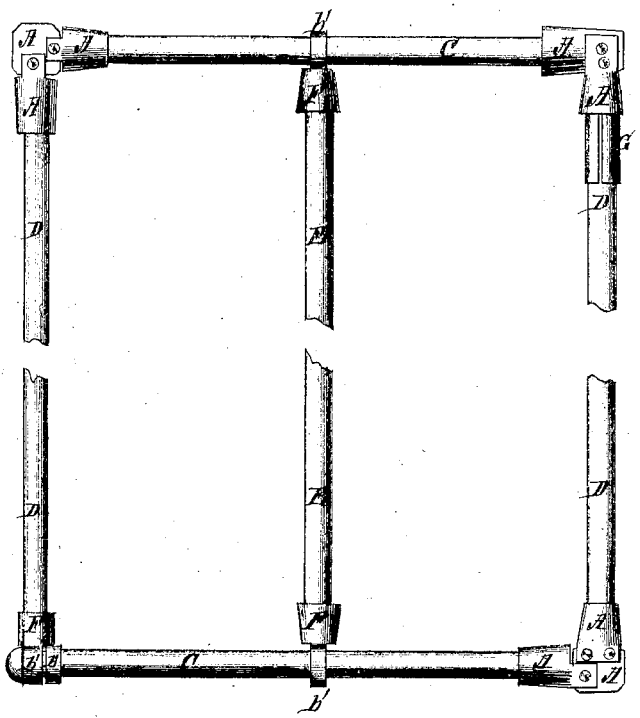
WITNESSES.
L. S. Mabee
Alex F. Roberts
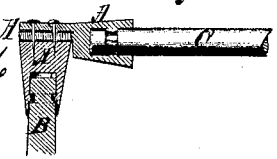
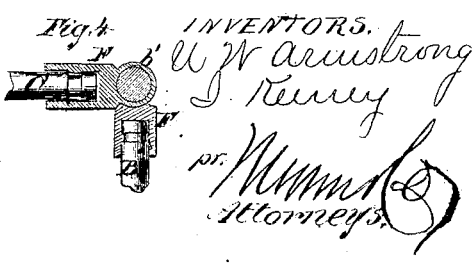
INVENTORS.
W. W. Armstrong
J. Keeney
pr. [signature]
Attorneys.

United States Patent Office.

UEL W. ARMSTRONG AND IRA KEENEY, OF EVANSVILLE, INDIANA, ASSIGNORS TO U. W. ARMSTRONG.

Letters Patent No. 100,966, dated March 22, 1870.

IMPROVED RUBBER CONNECTION FOR MOSQUITO-NET FRAMES.

The Schedule referred to in these Letters Patent and making part of the same

*To all whom it may concern:*

Be it known that we, UEL W. ARMSTRONG and IRA KEENEY, of Evansville, in the county of Vanderburg and State of Indiana, have invented a new and useful Improvement in Rubber Connections for Mosquito-Net Frames; and we do hereby declare that the following is a full, clear, and exact description thereof, which will enable others skilled in the art to make and use the same, reference being had to the accompanying drawings forming part of this specification, in which—

Figure 1 is an end view of a mosquito-net frame to which our improvement has been attached, partly in section, to show the construction.

Figure 2 is a top view of the same.

Figure 3 is a detail sectional view illustrating the construction.

Similar letters of reference indicate corresponding parts.

Our invention has for its object to furnish improved means for connecting the upright and horizontal bars of a mosquito-net frame to each other, which shall be simple in construction and will enable the frame to be easily put up and taken down when required; and It consists in the construction of the connections as hereinafter more fully described.

A are three short rubber tubes at right angles with each other, and which may be formed solid in one piece, or may be securely attached to each other, as may be desired or convenient. These tubes are designed to receive the ends of the upright bars B and horizontal bars C D of the frame.

The tubes of the connections A may be made similar to the part of a rubber nursing-nipple that is sprung over the mouth of a nursing-bottle, to enable them to take a firmer hold upon the bars B C D.

The ends of the bars B C D may be made with a circular groove around them, to enable the rubber tubes, by contracting into said grooves, to hold the said bars more securely.

The bars B C D may be made with round tenons upon their ends of about half the length of the tubes A, so that larger or smaller sets of bars may be used with the same set of rubber connections.

The central horizontal bar E is connected to the end horizontal bars C by the rubber tubes F which receive the ends of the said bar E, and upon the other ends of which are formed the rings b' which are slipped over the end horizontal bars C, as shown in figs. 1 and 2.

If desired, the ring tubes F b' may be used to form the corner or triangular connections. In this case only two tubes are used, which receive the ends of two of the bars, and which are secured to the end of the third bar by a large-headed nail or screw driven or screwed into the end of the said third bar, and the head of which should be made so large that the rings b' of the tubes F cannot pass over it.

G are short open tubes or ferrules, preferably of metal, which may be inserted in the rubber tubes to receive the ends of the bars of the frame, and enable larger bars to be inserted in said rubber tubes than could be without the use of said open ferrules.

Having thus described our invention,

We claim as new and desire to secure by Letters Patent—

1. The three-tube rubber connections A, for connecting the upright and horizontal bars of a mosquito-net frame to each other, constructed substantially as herein shown and described.

2. The ring tubes F b', whether used for connecting the horizontal bars or the upright and horizontal bars, substantially as herein shown and described.

3. The open tube or ferrule G, when used in combination with the rubber tubular connections A and F b', either or both, and with the bars of a mosquito-net frame, substantially as herein shown and described, and for the purpose set forth.

U. W. ARMSTRONG.
IRA KEENEY.

Witnesses:
HENRY KAETZ,
JESSE ARMSTRONG.